United States Patent
Singer

[15] 3,662,712
[45] May 16, 1972

[54] CONVERTIBLE PEN

[72] Inventor: Murray Singer, 1626 N. 28th Court, Hollywood, Fla. 33020

[22] Filed: Apr. 8, 1971

[21] Appl. No.: 132,273

[52] U.S. Cl. .................................................. 119/17, 119/19
[51] Int. Cl. ................................................................ A01k 01/02
[58] Field of Search ...................... 119/17, 19, 15, 7, 8, 9, 10, 119/11, 12; 220/1.5, 29; 296/24 R, 24 C; 217/36; 105/371

[56] References Cited

UNITED STATES PATENTS

| | | | |
|---|---|---|---|
| 3,530,830 | 9/1970 | Smith | 119/15 |
| 452,259 | 5/1891 | Butz | 119/7 |
| 507,991 | 11/1893 | Bullock | 217/36 X |
| 2,595,337 | 5/1952 | Coyner | 119/10 |
| 2,975,929 | 3/1961 | Sjoblom | 220/1.5 X |

Primary Examiner—Hugh R. Chamblee
Attorney—Settle and Oltman

[57] ABSTRACT

An animal pen having a platform dividing the pen into two levels each of which is adapted to contain small animals, the platform being removable to convert the pen to receive cargo or larger animals. The pen is shaped to fit in a vehicle, such as an airplane, for transport of the animals or cargo by the vehicle.

10 Claims, 6 Drawing Figures

INVENTOR.
MURRAY SINGER.
BY
SETTLE & OLTMAN.

PATENTED MAY 16 1972 3,662,712

INVENTOR.
MURRAY SINGER.
BY
SETTLE & OLTMAN.

CONVERTIBLE PEN

BACKGROUND OF THE INVENTION

At the present time, cargo is often shipped on aircraft in pre-loaded containers which are known in the field as "igloos". These containers are typically a fiberglass dome which is secured on a pallet. The container is loaded fully with cargo, closed as with nets or straps, and tied down to the pallet. A number of these containers are placed in a cargo aircraft through a door and slid along the length of the aircraft with the pallet fitting under rails which hold the containers down. The containers are shaped to fit the aircraft so that the aircraft is fully utilized.

In order to ship animals on aircraft, however, no fully satisfactory container has been previously developed. Animals have been shipped in large boxes, but this has involved considerable waste of space in the aircraft. With such boxes, the interior of the aircraft had to be specially set up, and this involved a considerable waste of time during which the aircraft was grounded both in loading and unloading animals. Cleaning the aircraft has also been a problem. Furthermore, when the animals have reached their destination, it may be necessary for the aircraft to return empty which is economically wasteful of the valuable space on the aircraft.

SUMMARY OF THE INVENTION

The present invention is a dual purpose container which is particularly useful on cargo aircraft, but which can be used on other vehicles. The container is essentially a pen in which animals can be transported on a particular flight of an aircraft, and for the return flight the pen can be converted so as to contain ordinary cargo. Thus, there is no waste of space on the aircraft on either flight.

For carrying animals, the pen has a base floor, and a platform above the base floor which divides the pen into two levels each of which is adapted to contain small animals. After the animals have reached their destination, alternative uses of the pen are possible. The pen can be loaded with small animals on both the upper and lower levels again for the next flight. Alternatively, the platform can be removed from the pen and either put on the base floor or removed entirely from the container. The container can then be loaded with ordinary cargo for the next flight. As another alternative, the platform can be removed and the container can be loaded with larger animals such as horses, cattle or the like.

In a preferred embodiment, one end of the container is a door which can be swung open to allow the platform to be removed and to allow cargo to be packed in the container. There are preferably two smaller doors built into the large door, with each of these smaller doors opening into a respective level of the pen. Small animals can be loaded into the pen through these smaller doors. One side of the container may have feed openings through which food can be supplied to the animals. Ventilation of the pen is important since animals consume considerable oxygen, and the walls of the container have ventilation openings in them to assure proper ventilation.

Accordingly, it is an object of the present invention to provide a convertible container in which animals can be transported on a given flight of an aircraft and in which cargo can be transported on another flight.

Another object of the invention is to provide a dual purpose animal pen and cargo container which is divided by a platform into two levels for carrying small animals, the platform being removable to convert the pen to receive larger animals or cargo.

Another object of the invention is to provide a convertible pen with a large entrance through which cargo can be packed in the pen and with smaller entrances through which small animals can be loaded into the pen.

A further object of the invention is to provide a convertible pen with openings for ventilation and with other openings for supplying food to animals in the pen.

A further object of the invention is to reduce the objectionable aspects of waste from animals being shipped in a pen.

Other objects of this invention will appear from the following description and appended claims, reference being had to the accompanying drawings forming a part of this specification wherein like reference characters designate corresponding parts in the several views.

Figure 1:
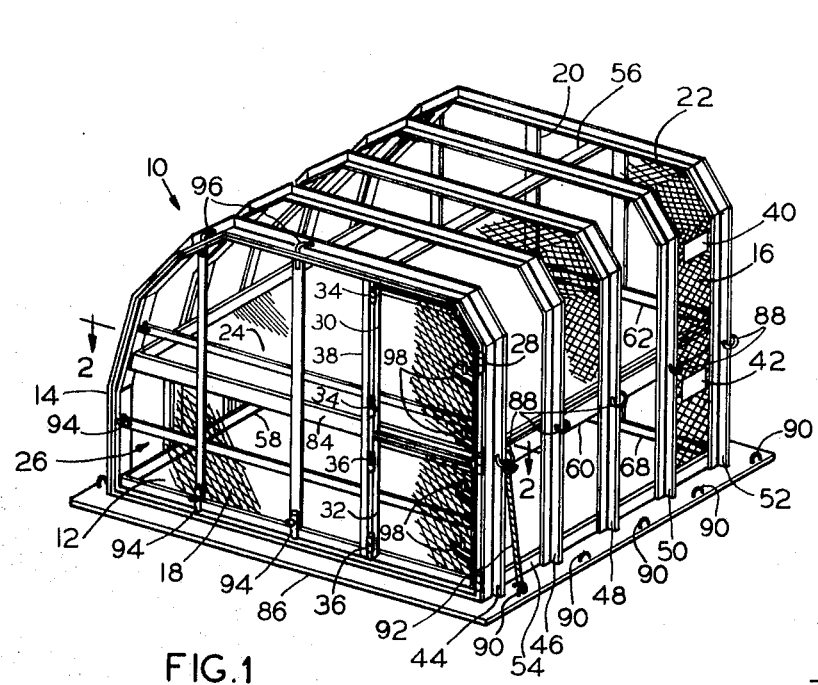
FIG. 1 is a perspective view of a convertible pen in accordance with one embodiment of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

AS SHOWN ON THE DRAWINGS

The convertible pen has a floor 12, sidewalls 14 and 16, end walls 18 and 20, and a ceiling 22, all of which together form an enclosure which is shaped to fit in an aircraft. The pen 10 has a platform 24 spaced about half way up the pen above the base floor 12, and the platform 24 divides the pen into two levels, each of which is designed to contain small animals. Thus, small animals can be carried in the pen on the base floor 12 and also on the platform 24, and the pen can be loaded into an aircraft for transport by the aircraft to a desired destination. When the aircraft reaches that destination, each pen is removed from the aircraft, the animals are unloaded from the pen, and the pen can then be used in various ways for the next flight. For example, the pen can remain in the configuration shown in FIG. 1 so that other small animals can be carried on both the base floor 12 and the platform 24 during the next flight. Alternatively, the platform 24 can be removed by opening a door 26 (FIG. 5) and either left out of the pen or reinserted on top of the base floor 12. With the pen in this configuration, ordinary cargo can be loaded into it and shipped on the next flight. Alternatively, larger animals such as horses or cattle can be loaded into the pen for the next flight.

As previously mentioned, the pen has a large door 26 which forms the end wall 18 of the pen, and the door 26 is hinged at 28 to the main frame of the pen so that the door 26 can be opened to allow cargo or larger animals to be loaded into the pen. The door 26 carries two smaller doors 30 and 32 which are both hinged at 34 and 36 to a post 38 of the door 26. The smaller doors 30 and 32 open respectively onto the upper and lower levels of the pen, so smaller animals can be loaded into the pen through the doors 30 and 32. This can be done when the large door 26 is closed.

The sidewall 16 of the pen has two feed openings 40 and 42 through which food may be supplied to the upper and lower levels of the pen for feeding animals in the pen. The sidewall 16 of the pen is truncated as compared to the sidewall 14 so that when the pen is loaded into an airplane, a space is provided between the sidewall 16 and the side of the aircraft to allow an attendant to walk through this space to reach the openings 40 and 42. As viewed from either the end wall 18 or the end wall 20, the configuration of the pen is generally semi-circular, except that the sidewall 16 is truncated as previously explained. In some cases, it may not be necessary to leave such a space for an attendant, for example, on short flights, and and in such flights a pen may be used which fills all available space.

Figure 5:
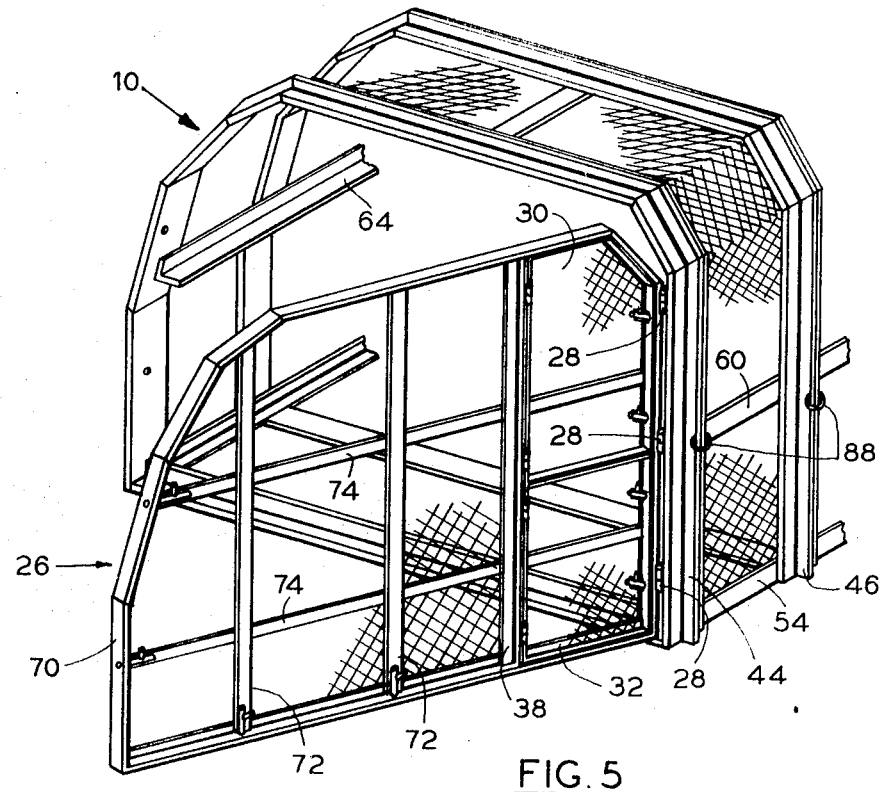
FIG. 5 is a fragmentary perspective view of one end of the pen showing a large door of the pen in an open position.
Figure 6:
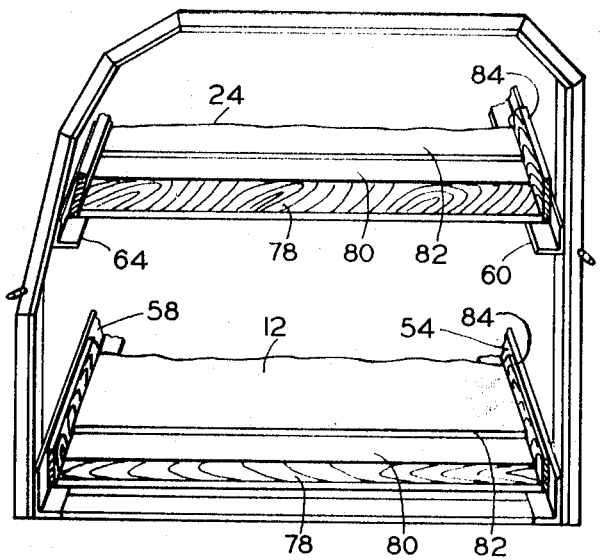
FIG. 6 is still another fragmentary perspective view of one end of the pen with the door removed showing the nature of the base floor and the platform of the pen.

The pen can be constructed in various ways. It may be made of metal, wood, fiberglass, molded plastic, or the like. In the particular embodiment illustrated in the drawings, the pen is made with metal framing and expanded metal screening. As shown, there are five upstanding frames 44, 46, 48, 50 and 52. Each of these frames follows the generally semi-circular configuration described previously. The frame members in this embodiment have a T-shaped cross section as shown at 44 in FIG. 2. The frame members are tied together by stringers 54, 56 and 58 which may be welded to the frame members. About half way up the sides of the walls of the pen are mounted support means in the form of angle members 60, 62 and 64. The platform 24 rests on these angle members in the manner shown particularly in FIG. 6. The lower stringers 54 and 48 as well as an end wall stringer 68 at floor level may also be angle members, and the base floor 12 rests on these latter angle members as shown in FIG. 6. In FIG. 5, both the platform 24 and the base floor 12 have been removed from the pen to show the angle supports on which they rest.

Figure 2:
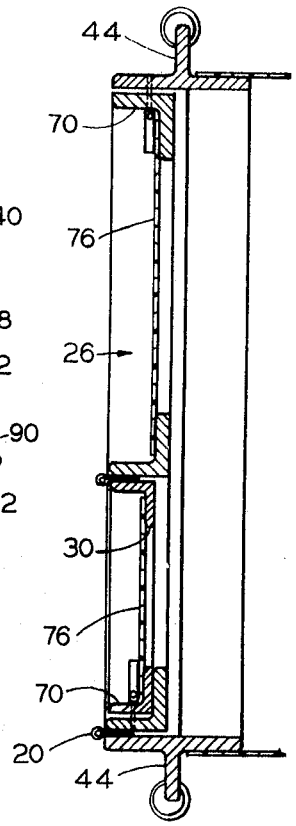
FIG. 2 is a fragmentary sectional view taken along line 2—2 of FIG. 1 looking in the direction of the arrows.

The door 26 in the illustrated embodiment is made with a generally semi-circular frame 70, the individual sections of which may be angle members as shown particularly in FIG. 2. The angle frame 70 fits with the end frame 44 of the pen as shown in FIG. 2. The frame 70 is hinged at 28 to frame 44 as with regular door hinges so that the whole door 26 can be swung open (FIG. 5) The door may have vertical posts 72 and horizontal stringers 74 welded to the frame 70 for additional bracing. The other end wall 20 may be constructed in essentially the same manner.

Figure 3:
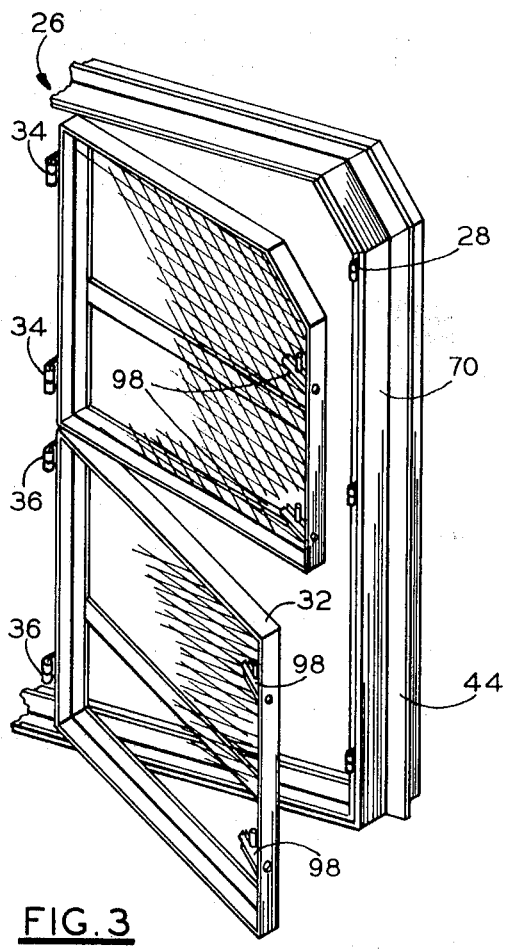
FIG. 3 is a fragmentary perspective view of only the entrance end of the pen showing an arrangement of doors.

The two smaller doors 30 and 32 which are carried by the door 26 are hinged to the post 38 as previously mentioned, so these smaller doors can be swung open in the manner shown in FIG. 3.

The pen should be ventilated to allow air to reach animals contained in it. If the pen is of a solid construction, vent openings should be provided in the pen. However, in the illustrated embodiment, ventilation is provided by covering the exterior surfaces of the pen except the floor 12 with expanded metal screening 76 as shown. The screening may be tack welded to the members of the pen. The screening assures that there will be ample flow of air into the pen.

Figure 4:
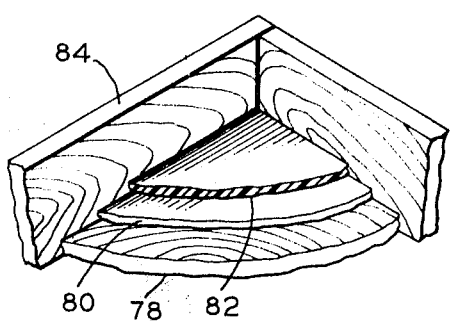
FIG. 4 is a fragmentary perspective view of a corner of one of the floors provided in the pen.

Both the base floor 12 and the platform 24 may be constructed in the manner shown particularly in FIGS. 4 and 6. Each of these floors has a wooden layer 78 which is coated on the top surface with fiberglass 80. The fiberglass may have sand distributed on its surface to provide a non-skid surface. Covering the fiberglass 80, there are layers of absorbent material 82 which in a preferred embodiment is "Celotex" or its equivalent. Straw or sawdust could be used as the absorbent material. A vertical rail 84 is secured around the perimeter of the floor 12 and the platform 24 to provide a vertical lip. Thus, waste material from the animals is contained on the layers 82 by the rails 84, and moisture is absorbed by the absorbent layer 82. The absorbent layers 82 may be replaced as needed, and a supply of this material may be carried on the aircraft.

When the pen 10 is being used, it is secured on top of a pallet 86. The pen 10 can be secured to the pallet 86 in any of a variety of ways, such as with nets, straps, ropes or the like. One embodiment of the pen has been submitted for approval by the Federal Aviation Administration under procedures known as TSD or STC. This involves standardization of hold down provisions. In FIG. 1, it may be seen that there are loops 88 mounted on the frame members 44,46,48,50 and 52, and similar loops 90 are on the pallet 86. The pen is simply secured with straps or ties 92 which are tied to the loops 88 and 90.

A number of the pens may be used on an aircraft at the same time. After the pens are loaded with animals, the pens mounted on pallets as shown in FIG. 1 are lifted into the aircraft and inserted through a door of the aircraft. The pallet 86 slides under a permanent rail along the sidewalls of the aircraft, and the entire pen is slid along the length of the aircraft, for example toward the tail of the aircraft. Thus, the pens are stacked in the aircraft horizontally with the endwalls 18 and 20 facing along the longitudinal axis of the aircraft. Since the sidewall 16 is truncated, there is space along the side of the pens for an attendant to walk so that he can have access to the pens.

Each pen is securely closed so that the doors will not accidentally come open. For this purpose, the main door 26 is bolted with suitable latches 94, and pins 96 are utilized along the top edge of the door 26. Similarly, the doors 30 and 32 are bolted closed with latches 98.

Thus, the invention provides a pen which can be used to carry small animals, large animals or cargo. For carrying small animals, the pen is divided by a horizontal platform into two levels, each of which can contain animals. The platform can be removed when the pen is to be used for carrying cargo or larger animals. The large door, smaller doors, and feed openings of the pen facilitate loading and feeding of the animals, and are also compatible with use of the pen for carrying cargo. The pen can be constructed in a variety of ways, and in each case suitable ventilation is provided to assure a proper air supply for the animals.

Having thus described my invention, I claim:

1. A convertible aircraft pen for carrying animals on aircraft and shaped to fit a rounded fuselage of the aircraft, said pen comprising horizontal bottom support means, a rectangular horizontal bottom floor retained on said bottom support means, a side and top enclosing wall defined by vertical and angled portions and having parallel bottom edges affixed with said bottom support means and extending from one of said bottom edges up and across said floor and down in a generally semicircular configuration to the other bottom edge, said side and top enclosing wall extending semi-tubularly over the length of said bottom floor and being ventilated, end closure means connected to each end of said side and top wall closing at least the major portion of each of said ends, said end closure means having means providing at least one door means opening into an end of said pen, upper support means mounted on opposite sides of said sidewall medially between said bottom floor and the top of said wall, and a platform removably mounted on said upper support means, said platform dividing the interior of said pen into levels each adapted to contain small animals, and said platform being removable from said upper support means so that said pen can contain larger animals or cargo, said platform and said bottom floor each having liquid retaining means comprising an imperforate surface and upstanding retainer means at the outside thereof for confining and retaining waste.

2. The convertible pen as claimed in claim 1 in which at least one of said end closure means comprises a door.

3. The convertible pen as claimed in claim 1 in which said end closure means includes doors respectively opening onto said levels of said pen.

4. The convertible pen as claimed in claim 1 in which said side and top wall has a generally vertical flattened and truncated side providing an access space in the aircraft alongside said pen.

5. The convertible pen as claimed in claim 4 in which said side and top wall has openings at said flattened and truncated side respectively leading to said levels of said pen through which food may be supplied to the animals.

6. The convertible pen as claimed in claim 1 including absorbent pads on said floor and said platform.

7. The convertible pen as claimed in claim 1 in which said side and top wall comprises metal screening.

8. The convertible pen as claimed in claim 1 in which said side and top wall comprises fiberglass.

9. The convertible pen as claimed in claim 1 in which said side and top wall comprises molded plastic.

10. A convertible aircraft pen for carrying animals on aircraft, said pen comprising horizontal bottom support means, a rectangular horizontal bottom floor, a side and top enclosing wall defined by vertical and angled portions and having parallel bottom edges affixed with said bottom support means and extending from one of said bottom edges up and across said floor and down to the other bottom edge, said side and top enclosing wall extending over the length of said bottom floor and being ventilated, end closure means connected to each end of said side and top wall closing at least the major portion of each of said ends, upper support means mounted on opposite sides of said side wall medially between said bottom floor and the top of said wall, a platform removably mounted on said upper support means, said platform dividing the interior of said pen into levels each adapted to contain small animals, and said platform being removable from said upper support means so that said pen can contain larger animals or cargo, said platform and said bottom floor being imperforate to retain waste and having upstanding retainer means at the outside thereof for confining waste and absorbent pad means lying thereon for absorbing liquid, and said end closure means including a plurality of door means openings onto said levels of said pen.

* * * * *